United States Patent [19]
Weisend, Jr. et al.

[11] Patent Number: 5,275,362
[45] Date of Patent: Jan. 4, 1994

[54] MULTIPLE PORT CONNECTION PNEUMATIC DEICING SYSTEM

[75] Inventors: Norbert A. Weisend, Jr., Cuyahoga Falls; Ernest E. Householder, Akron, both of Ohio

[73] Assignee: The B. F. Goodrich Company, New York

[21] Appl. No.: 914,956

[22] Filed: Jul. 16, 1992

[51] Int. Cl.$^5$ ............................................. B64D 15/16
[52] U.S. Cl. ............................ 244/134 A; 244/134 R
[58] Field of Search ........................................ 244/134

[56] References Cited

U.S. PATENT DOCUMENTS

| | | | |
|---|---|---|---|
| 2,436,889 | 3/1948 | Heston | 244/134 A |
| 2,489,799 | 11/1949 | Minshall | 244/134 A |
| 2,515,519 | 7/1950 | Lawrence et al. | 244/134 A |
| 2,957,662 | 10/1960 | Hess | 244/134 R |
| 4,516,745 | 5/1985 | Ely et al. | 244/134 A |
| 4,561,613 | 12/1985 | Weisend, Jr. | 244/134 A |
| 4,613,102 | 9/1986 | Kageorge | 244/134 R |
| 5,112,011 | 5/1992 | Weisend, Jr. et al. | 244/134 A |

Primary Examiner—Michael S. Huppert
Assistant Examiner—Anne E. Bidwell
Attorney, Agent, or Firm—Richard A. Romanchik

[57] ABSTRACT

A pneumatic deicing system includes a deicer assembly 32 comprised of an outer ply 52, an inner ply 54, and a plurality of inflatable tube-like members 36 provided therebetween. The deicer assembly is disposed directly on top of and bonded to the airfoil 34. Pressurized fluid is provided to the tube-like members via a manifold 40 in the deicer assembly which is positioned directly over a plurality of ducts 42 provided through the airfoil.

12 Claims, 8 Drawing Sheets

MULTIPLE PORT CONNECTION PNEUMATIC DEICING SYSTEM

FIELD OF THE INVENTION

The present invention relates to deicing systems and more particularly, a pneumatic deicing system adaptable to small cross-section airfoils.

BACKGROUND OF THE INVENTION

Under certain operating conditions aircraft are vulnerable to accumulation of ice on component surfaces. It is well known that such accumulation of ice can lead to disastrous results. A wide variety of systems have been developed for removing ice from aircraft during flight and can be placed into three general categories: thermal, chemical, and mechanical.

The mechanical category of deicing systems operate by distorting the airfoil surface of the aircraft to be deiced. Distortion of the airfoil surface causes cracking in the ice accumulated thereon, and subsequent dispersal of that ice into the air stream passing over the aircraft component.

The principal commercial mechanical deicing means is commonly referred to as pneumatic deicing wherein a component (e.g. the leading edge of a wing) of an aircraft is covered with a plurality of expandable, generally tube-like structures inflatable by employing a pressurized fluid, typically air. Upon inflation, the tubular structures tend to expand substantially the leading edge profile of the wing or strut and crack ice accumulating thereon for dispersal into the air stream passing over the aircraft component. Typically, such tube-like structures have been configured to extend substantially parallel to the leading edge of the aircraft component.

Figure 1:
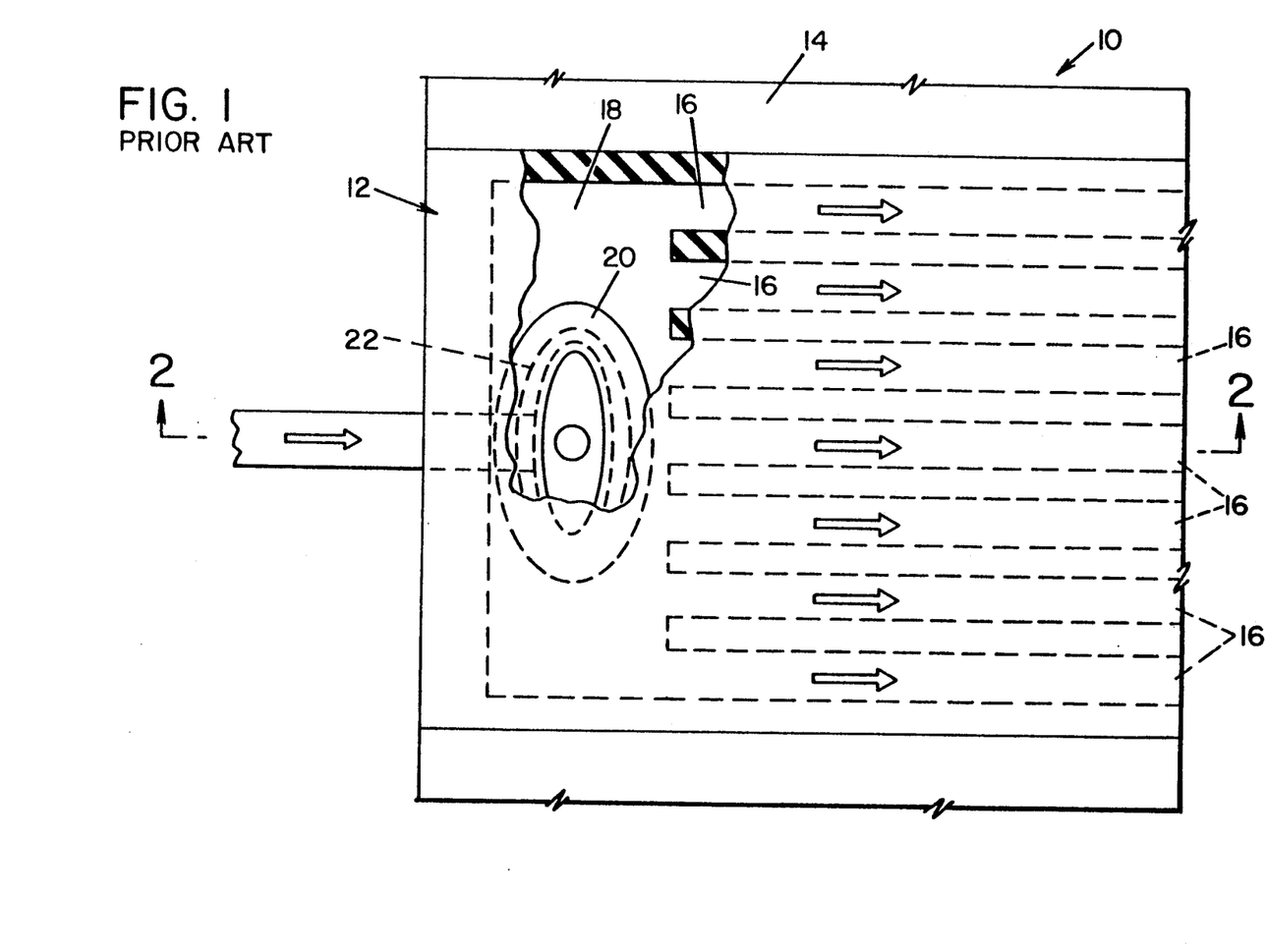
FIG. 1 is a top view of a prior art deicing system.

FIG. 1 illustrates a prior pneumatic deicer 12 formed from a composite having rubbery or substantially elastic properties. The deicer 12 is disposed on an airfoil 14. A plurality of tubes 16 are formed in the composite and are provided pressurized fluid, such as air, from a manifold 18. The manifold 18 is supplied fluid via a connector 20, which transfers fluid from a pressurized source (not shown). Connector 20 is integrated into the deicer 12 during manufacturing. Tubes 18 expand or stretch under pressure by 40% or more during inflation cycles, thereby causing a substantial change in the profile of the deicer (as well as the leading edge) to cause cracking of ice accumulating thereon.

Figure 2:
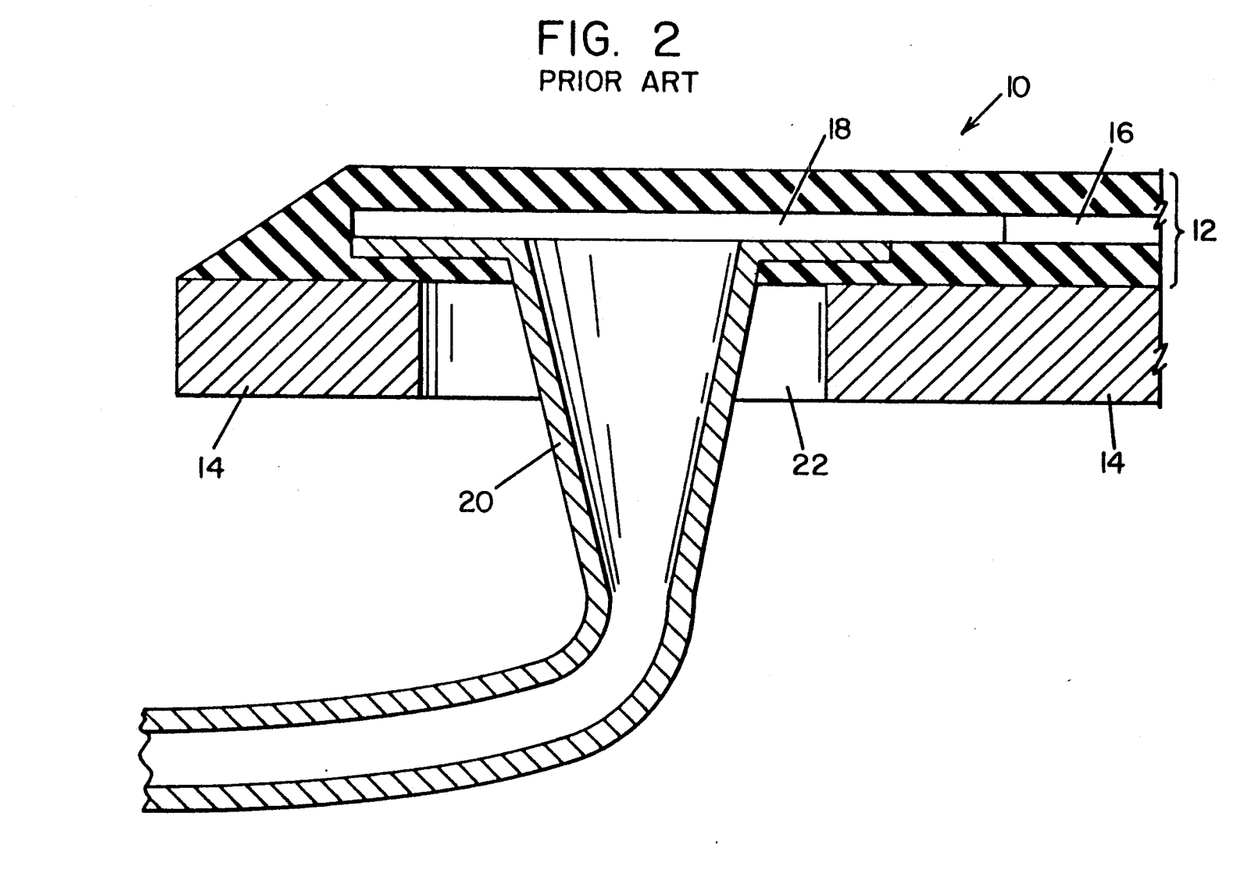
FIG. 2 is a cross sectional view, taken along line 2—2 of FIG. 1, of a prior art deicing system.

Referring now to FIG. 2, a prior pneumatic deicing system is comprised of a deicer 12 having a plurality of tubes 16 and a manifold 18 provided therein. The deicer 12 is bonded or attached to an airfoil 14. Pressurized fluid is provided to manifold 18 via a connector 20, which is integrated into deicer 12. A large hole 22 must be provided in airfoil 14 in order to accommodate connector 20. One drawback to the system illustrated in FIGS. 1 and 2 is that hole 22 provides a significant source of radar reflection when so exposed. Another drawback to this deicing system is that connector 20 represents a size limitation in that the thickness of the airfoil 14 cannot be smaller than the smallest manufacturable height of connector 20. In other words, connector 20 imposes a size restriction on the airfoil because the connector can be reduced in size only so much. The deicer system cannot be utilized therefore, for very thin airfoils, such as propellers of an airplane or the rotor of a helicopter. A deicing system which overcomes these deficiencies is therefore highly desirable.

DISCLOSURE OF THE INVENTION

According to the present invention, a pneumatic deicing system includes a plurality of port holes provided in the airfoil structure from the airfoil surface to a manifold, the manifold being connected via a supply line to a pressurized fluid source. The inflatable tubes of the pneumatic deicing unit are integrated into a common manifold provided in the deicing unit. The deicing unit is bonded and sealed directly on the airfoil, with an access hole being disposed over the plurality of port holes, thereby providing the connection means between the port holes and the inflatable tubes of the deicing unit.

The present invention greatly reduces the size of the fluid connection means for pneumatic deicers, thereby permitting utilization of a pneumatic deicer on a thin airfoil or surface not previously feasible. In addition, the present invention reduces radar visibility of pneumatic deicer applications if low radar visibility is a concern.

These and other objects, features, and advantages of the present invention will become more apparent in light of the detailed description of exemplary embodiments thereof, as illustrated by the drawings.

BEST MODE FOR CARRYING OUT THE INVENTION

The present invention provides an apparatus for deicing a leading edge surface. By "deicing" what is meant is the removal of ice subsequent to formation of the ice upon the leading edge. By "leading edge" what is meant is that portion of a surface of a structure which functions to meet and in substantial measure break an air stream impinging thereon. Examples of leading edges would be forward edge portions of wings, stabilizers, struts, nacelles, propellers, rotating wings, tail rotors, and other housings, objects and protrusions first impacted by an air stream flowing over an aircraft in flight as well as spars, struts and other structural elements of marine vessels, towers and buildings.

Figure 3:
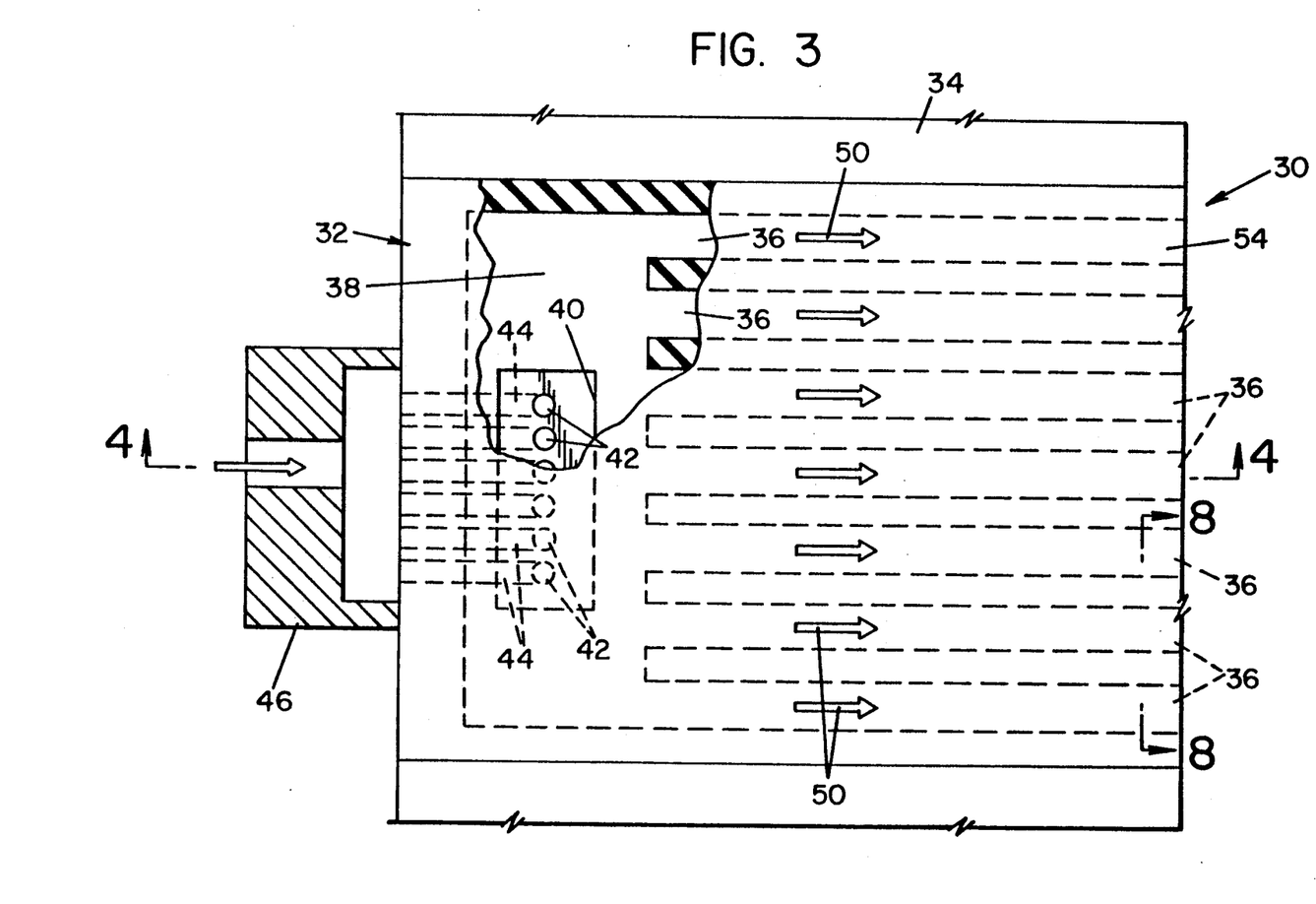
FIG. 3 is a top view of a first embodiment of a deicing system in accordance with the present invention.

Referring now to FIG. 3, a first embodiment of a deicing system 30 in accordance with the present invention includes a deicer assembly 32 comprised substantially of a flexible material or composite, described in greater detail hereinafter. The deicer assembly 32 is formed as part and parcel of an airfoil skin 34 thereby defining the outer contour of the airfoil. The preferred method of integrating the deicer assembly 32 with the airfoil 34 is to provide an indentation (not shown) in the airfoil, manufacture the deicer assembly as a separate entity, and bond or attach the deicer assembly onto the airfoil at the location of the indentation.

The principle inflatable portion of the deicer assembly 32 is a plurality of tube-like members 36 formed therein and arranged substantially parallel to one another. Tube-like members expand or inflate when provided a pressurized fluid, such as air. All inflatable tube-like members 36 are connected at one end of deicer assembly 32 by a manifold 38 also formed therein. Manifold 38 is provided pressurized fluid through an opening 40 in deicer assembly 32 which exposes a plurality of ports 42 disposed in the airfoil 34. Ports 42 are connected via a plurality of ducts 44 also disposed in the airfoil 34 to a connector means 46.

Operation of the deicing system in accordance with the present invention is as follows. Pressurized fluid is provided by a source (not shown) at the proximal end of deicer assembly 32 through the connector 46, through ducts 44, up ports 42, into the manifold 38 and into each tube-like member 36 wherein the modulus of elasticity of the material of deicer assembly 32 allows for expansion thereof, thereby causing ice accumulated on top of the surface to be dislodged. Arrows 50 illustrate the direction of fluid flow thus described from the proximal end to the distal end of deicer assembly 32.

Figure 4:
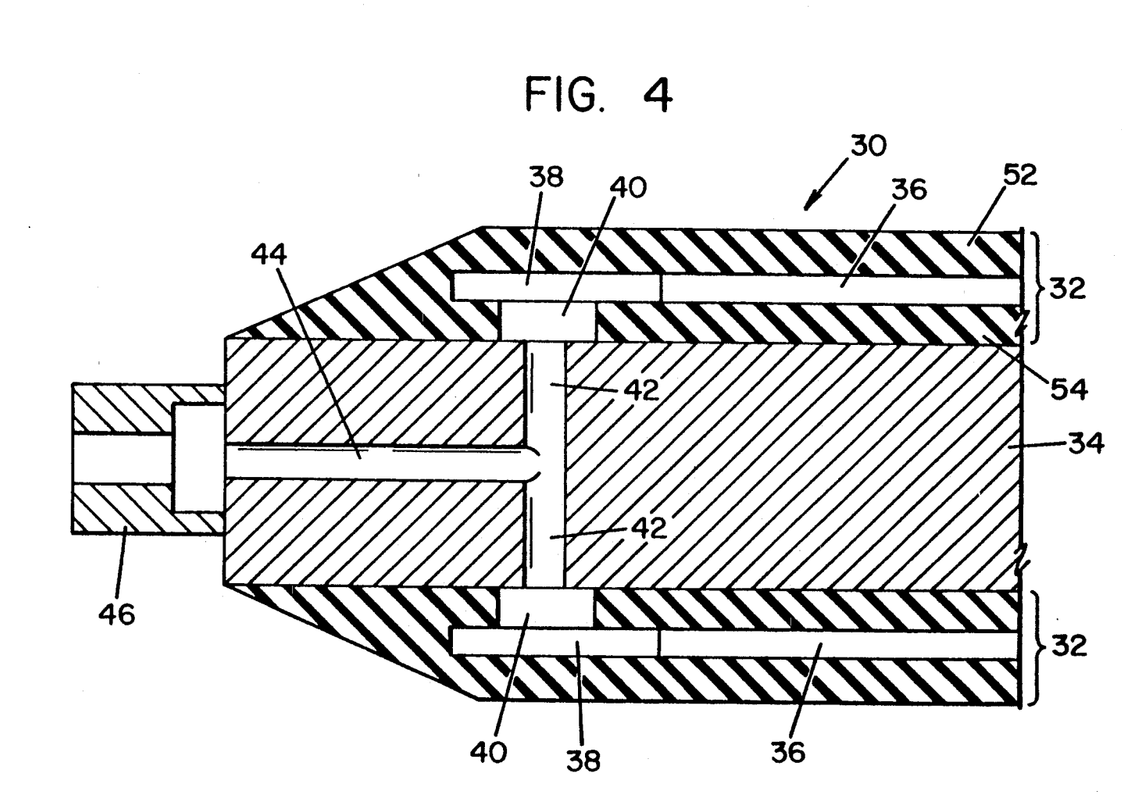
FIG. 4 is a cross sectional view taken along line 4—4 of FIG. 3, of a first embodiment of a deicing system in accordance with the present invention.

Referring now to FIG. 4, a deicing system 30 accordance with the present invention includes a deicer assembly 32 having inflatable tube-like members 38 formed between a top layer 52 and a bottom layer 54. Layer 54 is bonded or attached to the airfoil 34. The proximal end of the top layer 5 is contiguous with the bottom layer 54 and bonded to the airfoil 34. The tube-like members 36 extend from manifold 40. Manifold 40 is disposed over a plurality of ports 42 which extend into a plurality of ducts 44 which are provided fluid through connector 46. For purposes of illustration, a deicer assembly 32 is shown on each side of the airfoil 34. However, this need not be necessary, with a deicer assembly perhaps being located on only on side of the airfoil 34. It can be seen that airfoil 34 may be extremely thin since the deicing system of the present invention is not limited by the size of connectors, but is limited only by the size of the airfoil itself and the amount and pressure of fluid required. It is to be noted that ports 42 and ducts 44 are provided directly in the airfoil 34. An exemplary method of providing these fluid passageways is to drill a series of holes into the airfoil, provided the airfoil is solid. This technique is particularly useful if the airfoil 34 is comprised of a composite of plastics or glass.

Figure 5:
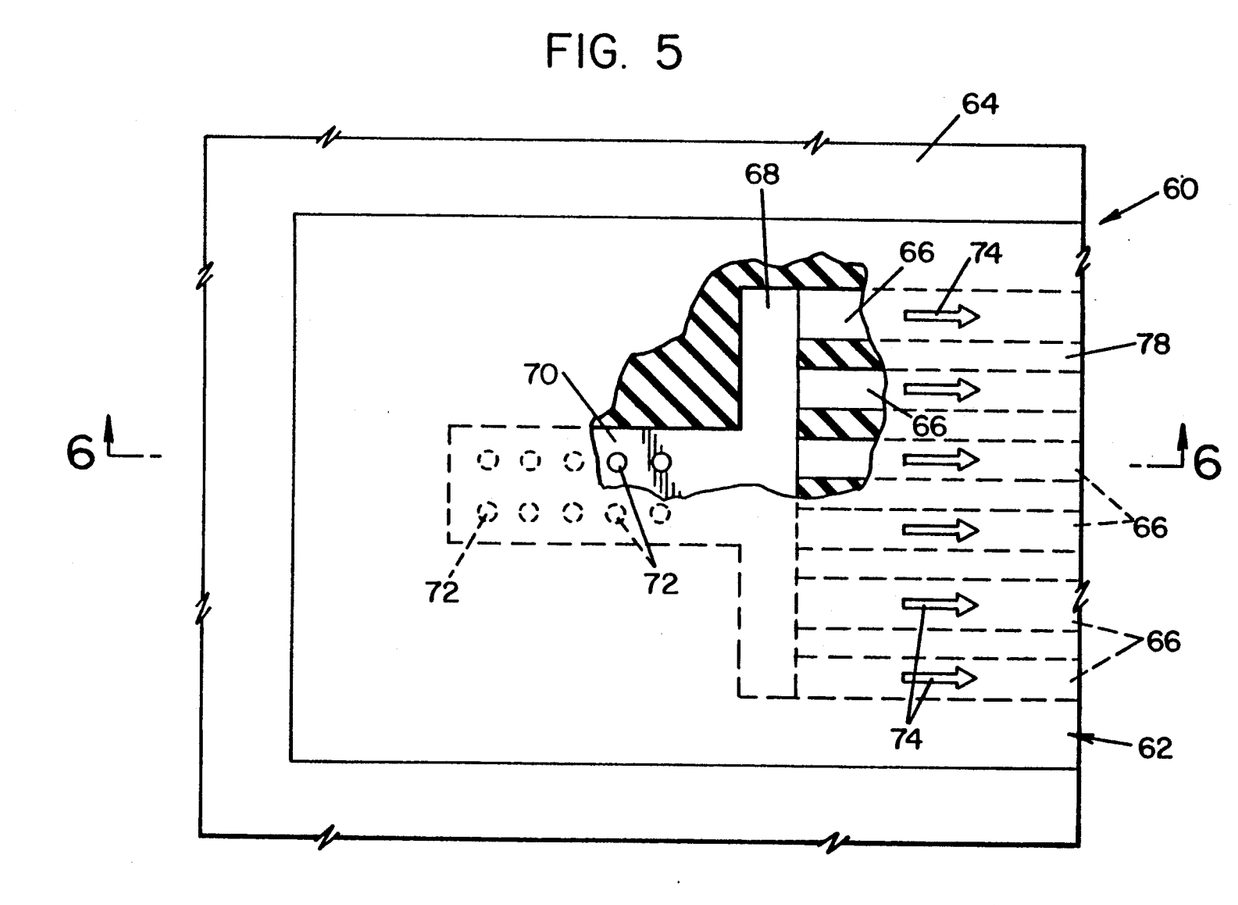
FIG. 5 is a top view of a second embodiment of a deicing system in accordance with the present invention.

Referring now to FIG. 5, a second embodiment of a deicing system 60 in accordance with the present invention includes a deicer assembly 62 disposed on airfoil 64. Deicer assembly 62 is constructed similarly to deicer assembly 32 described and illustrated hereinbefore, having a plurality of inflatable tube-like members 66 which extend substantially parallel to one another. Tubes 66 are inflated with a pressurized fluid, such as air, provided by a manifold 68 also formed in the deicer assembly 62. Manifold 68 is provided fluid from a second manifold 70, which is provided fluid via a plurality of ports 72 disposed in airfoil 64. Arrows 74 illustrate the direction of travel of fluid through tube-like members 66.

Figure 6:
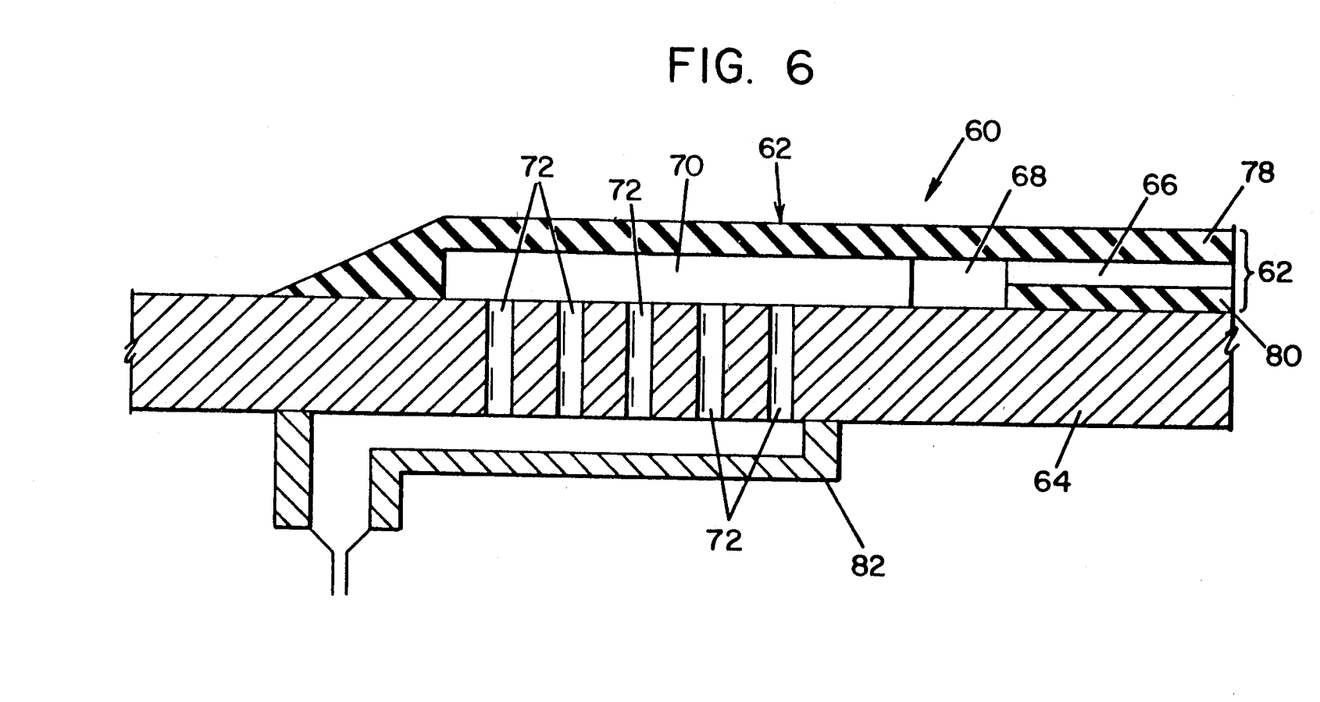
FIG. 6 is a cross sectional view taken along line 6—6 of FIG. 5 of a second embodiment of a deicing system in accordance with the present invention.

Referring now to FIG. 6, deicer assembly 62 is comprised of an expandable outer layer 78, an inner layer 80 and a plurality of tube-like members 66 disposed therebetween. Inner layer 80 is attached or bonded to the airfoil 64. Tube-like members 66 expand when pressurized to deform the upper layer 78 and cause ice to be dislodged. Pressurized fluid is provided to tube-like members 66 from a first manifold 68, integrated into deicer assembly 62 and contiguous with a second manifold 70. Manifold 70 is provided fluid from a plurality of ports 72 which extend through airfoil 64. A connection means 82 is attached to airfoil 64 opposite ports 72 for connecting ports 72 to a pressurized fluid source (not shown). Ports 72 may be comprised of a plurality of holes drilled through the airfoil structure 64, if the airfoil is solid such as a composite of plastic or glass. With this configuration, very thin airfoil structures may be deiced, because the fluid supply connection means to tube-like members 66 is not size restrictive (as opposed to the connection means in FIGS. 1 and 2).

Figure 7:
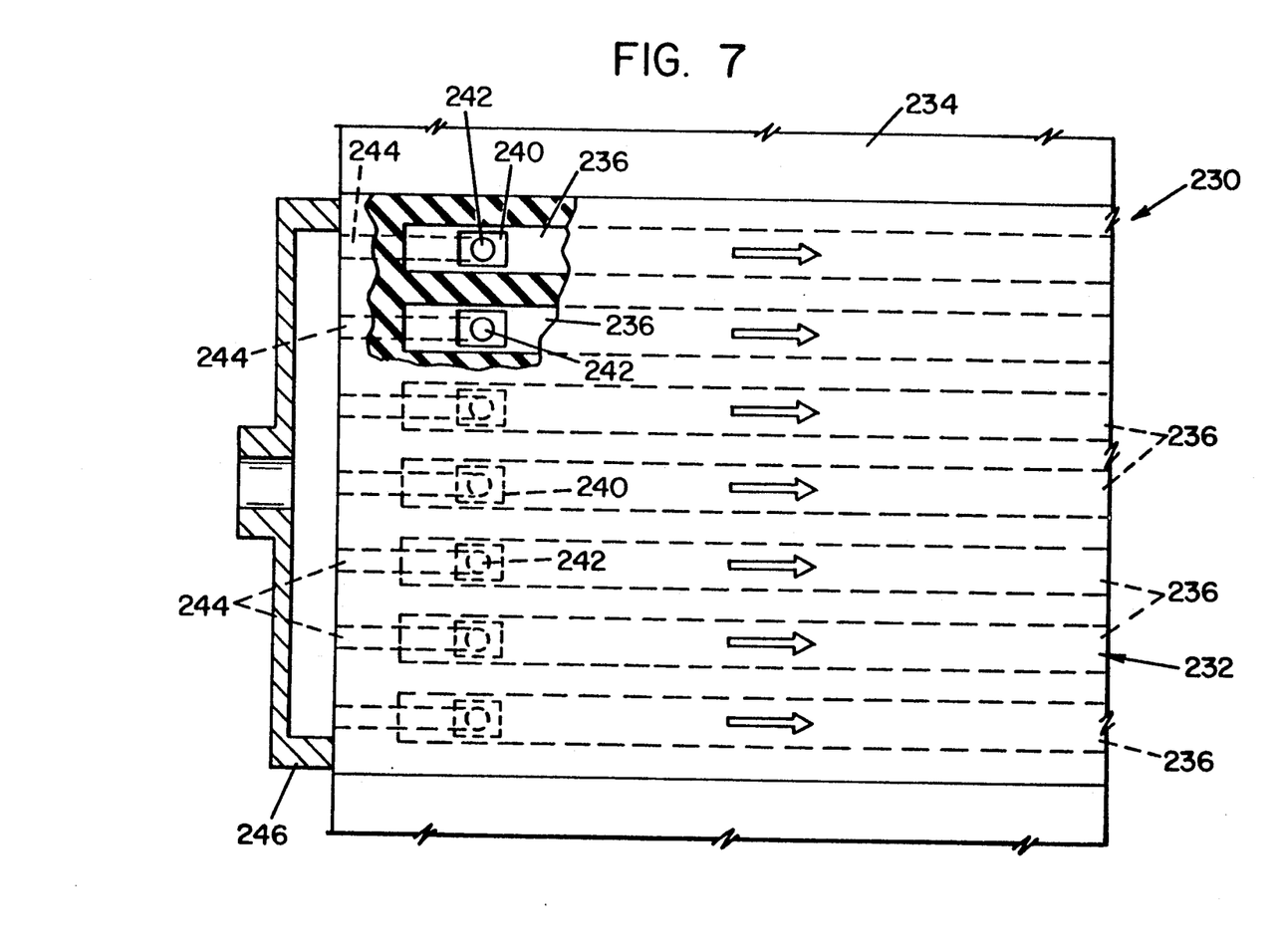
FIG. 7 is a top view of a third embodiment of a deicing system in accordance with the present invention.

Referring now to FIG. 7, wherein a pneumatic deicing system 230 in accordance with a third embodiment of the present invention is generally similar to the pneumatic deicing system embodiment illustrated hereinbefore in FIG. 3 and is thus indicated by references numerals corresponding to those discussed above, except that a 200 "prefix" is utilized. A deicer assembly 232 which is disposed on an airfoil 234 includes inflatable tube-like members 236. Pressurized fluid is provided through connector 246, ducts 244, ports 242 and into the tube-like members 236. Access holes 240 provide access through the bottom of the deicer assembly 232 for pressurized fluid to be transferred from ports 242 into tube-like members 236.

Figure 8:
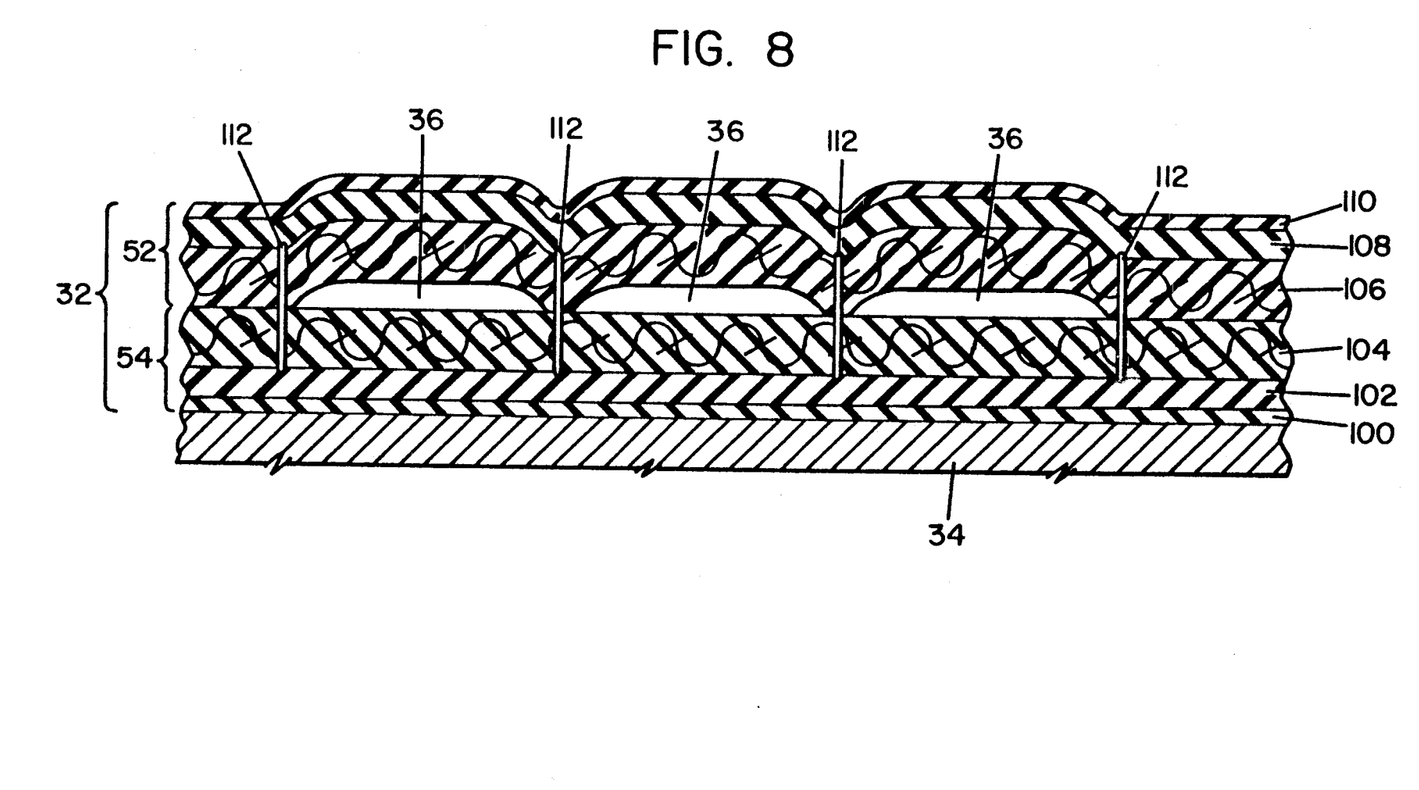
FIG. 8 is a cross sectional view taken along line 8—8 of FIG. 3, of a first embodiment of a deicing system in accordance with the present invention.

Referring now to FIG. 8, the preferred construction for deicer assembly 32 of FIG. 3 (and likewise deicer assemblies 62 and 232 of FIGS. 5 and 7) is a composite, comprised from bottom (the side of material bonded to the airfoil ) to top of: a) a bottom rubber layer 100 of 0.003 inch thick neoprene; b) a first gum layer 102 of 0.010 inch thick natural rubber; c) a rubber coated one side layer 104 of 0.015 inch thick nonstretchable nylon fabric; d) a rubber coated one side layer 106 of 0.020 inch thick stretchable nylon fabric; e) a second gum layer 108 of 0.020 inch thick natural rubber; f) a top layer 110 of 0.010 inch thick neoprene. Tube-like members 36 are created by sewing the nylon layers 104, 106 together in the appropriate pattern. In FIG. 8, thread lines 112 illustrate the forming of three tube-like members, which are illustrated in a partially inflated state. The preferred material for thread 112 is nylon or kevlar. Also for exemplary purposes, all lines in FIGS. 3, 5 and 7 which are created by sewing thread (as shown in FIG. 7) in this manner are illustrated as thick dotted lines. Layers 100 and 104 may be bonded to layer 102 utilizing an appropriate cement. Likewise layers 106 and 110 may be bonded to layer 108 using an appropriate cement. It is to be noted that the bottom three layers 100, 102 and 104 comprise bottom ply 54 of FIG. 4 and the top three layers 106, 108, 110 comprise top ply 52 of the same drawing.

The preferred bonding means to attach a deicer assembly 32 to the airfoil 34, particularly if the deicer assembly is constructed as illustrated in FIG. 8, is to apply an adhesive, such as catalog number 1300L manufactured by the 3M corporation, to both contacting surfaces. It is to be noted that the bonding means not only attaches the deicer assemblies 32, 62 to the airfoil, but also provides a seal to allow transfer of pressurized fluid from the ducts 42, 72 in the airfoils into the manifolds 40, 70 of the deicing assemblies 32, 62 respectively. The seal provided by the appropriate adhesive thus prevents fluid from leaking outside of the deicing assemblies. The corresponding seal utilized in prior deicing systems was provided by integrating the connector 20 into the deicer 12, as illustrated in FIG. 2 hereinbefore. The deicing system of the present invention thus simplifies both the manufacturing process for the deicer assembly and the process for connecting the deicer assembly to the external fluid supply.

It is to be noted that although FIG. 8 illustrates a cross section of the deicer assembly 32 illustrated in FIGS. 3 and 4, the structure of FIG. 8 may also be utilized for the deicer assemblies 62, 232 illustrated in FIGS. 5 and 7, respectively. Layers 100, 102 and 104 may therefore be utilized for bottom ply 80, and layers 106, 108, 110 may be utilized for top ply 78 of FIG. 6.

The deicing system of present invention provides for deicing capability of airfoils having a thickness of less than on inch, which heretofore has not been possible. Also, in order to maintain minimal radar signature it is recommended that ports 42, 72 be on the order of 0.060 inches in diameter. Having ports this small therefore allows for construction of a deicing system which can be attached to an airfoil which is less than one inch thick.

Although the invention has been shown and described with exemplary embodiments thereof, it should be understood by those skilled in the art that the foregoing and various other changes, omissions and additions may be made therein and thereto without departing with the spirit and the scope of the invention.

We claim:

1. A pneumatic deicing system which utilizes pressurized fluid from conduit connected to a fluid source, the pneumatic deicing system being comprised of:

an airfoil to be deiced comprising first and second sides and a plurality of fluid conductive paths provided through said airfoil from said first side to said second side;

a deicer attached to said first side of said airfoil, said deicer comprising a plurality of inflatable tubes means, a common manifold means in fluid connection with said inflatable tube means for providing pressurized fluid thereto, and an opening in said deicer at said common manifold means for placing said common manifold means in fluid connection with said fluid conductive paths said opening being disposed over said plurality of fluid conductive paths wherein said plurality of fluid conductive paths conduct pressurized fluid to said inflatable tube means through said manifold means;

sealing means for sealing said opening over said fluid conductive paths; and, connector means for placing said fluid conductive paths in fluid connection with the conduit, whereby said inflatable tube means are inflated by the pressurized fluid to cause dislodgement of ice accumulated thereon.

2. A pneumatic deicing system which utilizes pressurized fluid from conduit connected to a fluid source, the pneumatic deicing system being comprised of:

an airfoil to be deiced comprised of an end, first and second sides, a middle section, a plurality of first fluid conductive paths provided through said airfoil from said first side into said middle section, a plurality of second fluid conductive paths provided through said airfoil from said second side into said middle section, and a plurality of third fluid conductive paths provided through said airfoil from said end to said middle section for placing said plurality of first and second fluid conductive paths in fluid communication;

a pair of deicers attached on said first and second sides of said airfoil, each of said pair of deicers comprising a plurality of inflatable tubes means provided therein, a manifold means connected to said inflatable tube means for providing pressurized fluid thereto, and an opening in each said pair of deicers at said common manifold means for placing said common manifold means in fluid connection with said first, second and third fluid conductive paths each said openings being disposed over said plurality of first and second fluid conductive paths, wherein said plurality of second and third fluid conductive paths provides pressurized fluid to said manifold means;

sealing means for sealing said openings over said fluid conductive paths; and, connector means for placing said fluid conductive paths in fluid connection with the conduit, whereby said inflatable tube means are inflated by the pressurized fluid to cause dislodgement of ice accumulated thereon.

3. A pneumatic deicing system according to claim 2, wherein said pair of deicers are adjoined to form a singular deicing attachment.

4. A pneumatic deicing system according to claim 1 or 2, wherein said deicer is comprised of a composite of neoprene, natural gum, and nylon fabric.

5. A pneumatic deicing system according to claim 1 or 2, wherein said sealing means is comprised of an adhesive.

6. A pneumatic deicing system according to claim 1 or 2, wherein said airfoil is less than one inch thick.

7. A pneumatic deicing system according to claim 1 or 2, wherein the diameter of each of said fluid conductive paths is on the order of 0.060 inches.

8. A pneumatic deicing system according to claim 1 or 2, wherein the pressurized fluid is air.

9. A pneumatic deicing system according to claim 1 or 2, wherein said deicer is comprised of:

a bottom layer of elastomer disposed on said airfoil;

a nonstretchable layer of plastic fabric disposed on said bottom layer;

a stretchable layer of plastic fabric disposed on said nonstretchable layer; and, a top layer of elastomer disposed on said stretchable layer, wherein said manifold means and said tube-like members are formed by sewing said nonstretchable layer and said stretchable layer together in a predetermined pattern.

10. A method of deicing comprising the steps of:

providing an airfoil to be deiced comprising first and second sides and a plurality of fluid conductive paths provided through said airfoil from said first side to said second side;

attaching a deicer to said first side of said airfoil, said deicer comprising a plurality of inflatable tubes means, a common manifold means in fluid connection with said inflatable tube means;

providing an opening in said deicer at said common manifold means for placing said common manifold means in fluid connection with said fluid conductive paths said opening being disposed over said plurality of fluid conductive paths, wherein said plurality of fluid conductive paths conduct pressurized fluid to said inflatable tube means through said manifold means;

sealing said opening over said fluid conductive paths;

connecting said fluid conductive paths in fluid connection with the conduit, and, providing pressurized fluid to said manifold means through fluid conductive paths;

whereby said inflatable tube means are inflated by the pressurized fluid to cause dislodgement of ice accumulated thereon.

11. A method of deicing comprising the steps of:

providing an airfoil to be deiced comprising first and second sides and a plurality of fluid conductive paths provided through said airfoil from said first side to said second side;

attaching a deicer to the airfoil, said deicer having a plurality of inflatable tubes means provided therein and a manifold means connected to said inflatable tube means and being comprised of: a) a bottom layer of elastomer disposed on said airfoil; b) a nonstretchable layer of plastic fabric disposed on said bottom layer; c) a stretchable layer of plastic fabric disposed on said nonstretchable layer; and d) a top layer of elastomer disposed on said stretchable layer, wherein said manifold means and said inflatable tube means are formed by sewing said nonstretchable layer and said stretchable layer together in a predetermined pattern;

providing access from said fluid conductive paths to said manifold means;

sealing said manifold means over said fluid conductive paths;

providing pressurized air to said manifold means through said plurality of fluid conductive paths in the airfoil;

whereby said inflatable tube means are inflated by said pressurized air to cause dislodgement of ice accumulated thereon.

12. A method of deicing comprising the steps of:

providing an airfoil comprised of an end, first and second sides, a middle section, a plurality of first fluid conductive paths provided through said airfoil from said first side into said middle section, a plurality of second fluid conductive paths provided through said airfoil from said second side into said middle section, and a plurality of third fluid conductive paths provided through said airfoil from said end to said middle section for placing said plurality of first and second fluid conductive paths in fluid communication;

attaching a pair of deicers on said first and second sides of said airfoil, each of said pair of deicers comprising a plurality of inflatable tubes means provided therein, a manifold means connected to said inflatable tube means for providing pressurized air thereto, and an opening at said common manifold means for placing said common manifold means in fluid connection with said first, second and third fluid conductive paths;

sealing said openings over said first and second fluid conductive paths;

connecting said fluid conductive paths with the conduit; and, providing pressurized air through said openings and said manifold means into said inflatable tube means, whereby said inflatable tube means are inflated by the pressurized fluid to cause dislodgement of ice accumulated thereon.

* * * * *